Patented Feb. 1, 1944

2,340,371

UNITED STATES PATENT OFFICE 2,340,371

MANUFACTURE OF OXYGENATED ORGANIC COMPOUNDS

Henry Dreyfus, London, England, assignor to Celanese Corporation of America, a corporation of Delaware No Drawing. Application March 11, 1941, Serial No. 382,743. In Great Britain March 21, 1940

11 Claims. (Cl. 260—601)

This invention relates to the manufacture of oxygenated organic compounds more particularly by the utilisation of halogenated olefine compounds.

According to the invention, useful oxygenated organic compounds, and especially aliphatic aldehydes, olefine oxides or ketones are produced by subjecting halogen derivatives of olefines to the action of a heating bath containing zinc oxide dispersed, i. e. dissolved or suspended, therein.

A most important embodiment of the invention is in the treatment of ethylene chlorhydrin and ethylene chloride for the manufacture of acetaldehyde and ethylene oxide but the invention includes also the treatment of the chlorhydrins, the chlorides and other halogen derivatives of propylene, butylene and other olefines to produce aldehydes, olefine oxides or ketones.

The process is one which does not need the presence of water in order to satisfy the chemical changes which take place but, nevertheless, it has been found that the presence of a small quantity of water, for instance a quantity equal to about one molecule for each molecule of the halogen compound used as starting material, has a very beneficial effect on the process, especially as regards the yield of desired product. Even smaller quantities of water influence favourably the course of the reactions involved in the process, for instance quantities down to 0.02–0.05 molecules for each molecule of halogen compounds but, in general, it is desirable to use a quantity equal to one molecule for each molecule of halogen compound and larger quantities, e. g. up to four or five or more molecules for each molecule of halogen compound can be used if desired. Thus, the production of ethylene chlorhydrin usually leads to the formation of a product containing somewhat less than 10% of ethylene chlorhydrin in aqueous solution and the concentration of this solution can be doubled by a simple distillation practically the whole of the chlorhydrin passing over during distillation of the first half of the solution. This more concentrated solution or the vapours produced in such a distillation can be used immediately for the process of the present invention.

Very satisfactory results have been obtained by using as the heating bath zinc chloride containing a little water e. g. 4 or 5% or somewhat more, for instance up to 15% and containing also some dissolved or suspended zinc oxide. Such a mixture, which can be kept molten at temperatures in the neighbourhood of 200–250° C. is very active in the process of the present invention at these temperatures. Higher temperatures can, however, be employed if desired, e. g. up to 400° C. or even higher, while even at lower temperatures, e. g. down to 150° C., conversion of the halogen derivatives of olefines into the desired products takes place. It is to be noted that the quantity of zinc oxide present should be kept well below a quantity equal molecularly to the zinc chloride so as to avoid the danger of solidification of the zinc oxide and zinc chloride by formation of the cement-like zinc oxychloride. In general a quantity of zinc oxide equal to about 20 to 25% of the weight of the zinc chloride present is most satisfactory although somewhat more zinc oxide can be used if desired. During the process zinc oxide present initially is transformed into additional zinc chloride. According to the preferred form of the invention, therefore, zinc chloride is continuously or from time to time withdrawn from the vessel containing it, part of the zinc chloride is enriched in zinc oxide and returned to the reaction vessel, the excess zinc chloride preferably being subjected to reaction with oxygen to regenerate zinc oxide and chlorine for further use in the process. It is preferred to operate such a process so that at no time does the amount of zinc oxide present in the bath fall below about 10% on the weight of the zinc chloride.

Under such conditions ethylene chlorhydrin and ethylene chloride can be transformed into acetaldehyde with high yields and conversion, sometimes together with ethylene oxide, unchanged starting material or condensable by-products being separated from the substances issuing from the zinc chloride by cooling and returned to the process in admixture with a fresh supply of starting materials.

Besides zinc chloride, other inorganic compounds may be used as the basis of the bath in which the zinc oxide is dispersed, compounds having a strong dehydrating action, whether this dehydrating action is exerted physically, chemically or catalytically being especially suitable. Such substances are, for example, acid phosphates, acid sulphates such as alkali metal bisulphates and acid reacting sulphates such as zinc and copper sulphates and hygroscopic chlorides such as calcium chloride. Where the particular salt employed does not melt at the temperature it is desired to employ, mixtures may be employed with more easily fusible substances. It is usually possible, however, by employing an exceedingly concentrated aqueous solution to produce a mixture which it is possible to maintain at the desired reaction temperature in a fused or fluid state.

The starting material may be preheated to the temperature of the heating bath or even to a temperature above this before being brought into contact with the catalyst; where relatively high temperatures are used in the process it is undesirable to heat the starting material to a temperature above that of the heating bath and, if desired, the preheating temperatures may be somewhat below this, e. g. 50–80° C. below.

It is preferred to carry out the process at a pressure not substantially in excess of atmospheric pressure and if desired reduced pressure may be used. Thus, the process in the reaction zone may be maintained from $\frac{1}{5}$–$\frac{1}{3}$ of an atmosphere or even lower, e. g. down to $\frac{1}{10}$ or $\frac{1}{20}$ of an atmosphere.

The products should be removed from the reaction zone as soon as possible, and this object can best be achieved by employing a rapid stream of starting material; it is preferred also to arrange for rapid cooling of the products leaving the heating bath. If desired, diluent gases may be employed in admixture with the starting materials, and such diluents assist very considerably in removing the products from the heating bath as they are produced.

Nitrogen, carbon dioxide and hydrogen are suitable diluents, and may be present in quite large proportions, equal, for instance, to 4 or 5 or even more, e. g. 10 times the volume of the vapour of the starting material.

The following example illustrates the invention as applied to the treatment of ethylene chlorhydrin.

*Example*

A mixture is prepared from zinc chloride and 20% of its weight of zinc oxide and 5–7% of water. This mixture is then heated to 250–255° C. at which temperature it is fluid. The fluid mixture is charged into a reaction vessel fitted with a stirrer and through the fluid mixture maintained at 250–255° C. there is passed vaporous ethylene chlorhydrin together with sufficient water vapour to maintain the composition of the fluid mixture substantially constant.

Vapours issuing from the reaction zone are cooled to a temperature of 50–60° C. the liquid condensate being returned to the process, this condensation being effected, if desired, by refluxing. Acetaldehyde is then recovered from the uncondensed products by stronger cooling and/or scrubbing with water.

Having described my invention, what I desire to secure by Letters Patent is:

1. Process for the controlled oxidation of halogen addition derivatives of olefines, which comprises passing said derivatives through a hot fluid bath comprising a major proportion of zinc chloride and a minor proportion of zinc oxide.

2. Process for the controlled oxidation of halogen addition derivatives of olefines, which comprises passing said derivatives, in vaporous form, through a hot fluid bath comprising a major proportion of zinc chloride and a minor proportion of zinc oxide.

3. Process for the controlled oxidation of halogen addition derivatives of olefines, which comprises passing said derivatives, in vaporous form, through a hot fluid bath heated to 150 to 400° C. and comprising zinc chloride and 20 to 25% of its weight of zinc oxide.

4. Process for the controlled oxidation of halogen addition derivatives of olefines, which comprises passing through a hot fluid bath heated to 150 to 400° C. and comprising zinc chloride, 20 to 25% of its weight of zinc oxide and 4 to 15% of water, a vaporous halogen addition derivative of an olefine in admixture with sufficient water to maintain the water content of said fluid bath.

5. Process for the controlled oxidation of halogen addition derivatives of olefines, which comprises passing olefine chlorhydrins, in vaporous form, through a hot fluid bath comprising a major proportion of zinc chloride and a minor proportion of zinc oxide.

6. Process for the controlled oxidation of halogen addition derivatives of olefines, which comprises passing through a hot fluid bath heated to 150 to 400° C. and comprising zinc chloride, 20 to 25% of its weight of zinc oxide and 4 to 15% of water, a vaporous olefine chlorhydrin in admixture with sufficient water to maintain the water content of said fluid bath.

7. Process for the controlled oxidation of halogen addition derivatives of olefines, which comprises passing ethylene chlorhydrin, in vaporous form, through a hot fluid bath comprising a major proportion of zinc chloride and a minor proportion of zinc oxide.

8. Process for the controlled oxidation of halogen addition derivatives of olefines, which comprises passing through a hot fluid bath heated to 150 to 400° C. and comprising zinc chloride, 20 to 25% of its weight of zinc oxide and 4 to 15% of water, vaporous ethylene chlorhydrin in admixture with sufficient water to maintain the water content of said fluid bath.

9. Process for the controlled oxidation of halogen addition derivatives of olefines, which comprises passing propylene chlorhydrin, in vaporous form, through a hot fluid bath comprising a major proportion of zinc chloride and a minor proportion of zinc oxide.

10. Process for the controlled oxidation of halogen addition derivatives of olefines, which comprises passing through a hot fluid bath heated to 150 to 400° C. and comprising zinc chloride, 20 to 25% of its weight of zinc oxide and 4 to 15% of water, vaporous propylene chlorhydrin in admixture with sufficient water to maintain the water content of said fluid bath.

11. Process for the preparation of acetaldehyde by the controlled oxidation of ethylene chlorhydrin, which comprises passing through a hot fluid bath heated to 250 to 255° C. and comprising zinc chloride, 20% of its weight of zinc oxide and 5 to 7% of water, vaporous ethylene chlorhydrin in admixture with sufficient water vapor to maintain the water content of said fluid bath, and recovering acetaldehyde from the vapors issuing from the reaction zone.

HENRY DREYFUS.